UNITED STATES PATENT OFFICE.

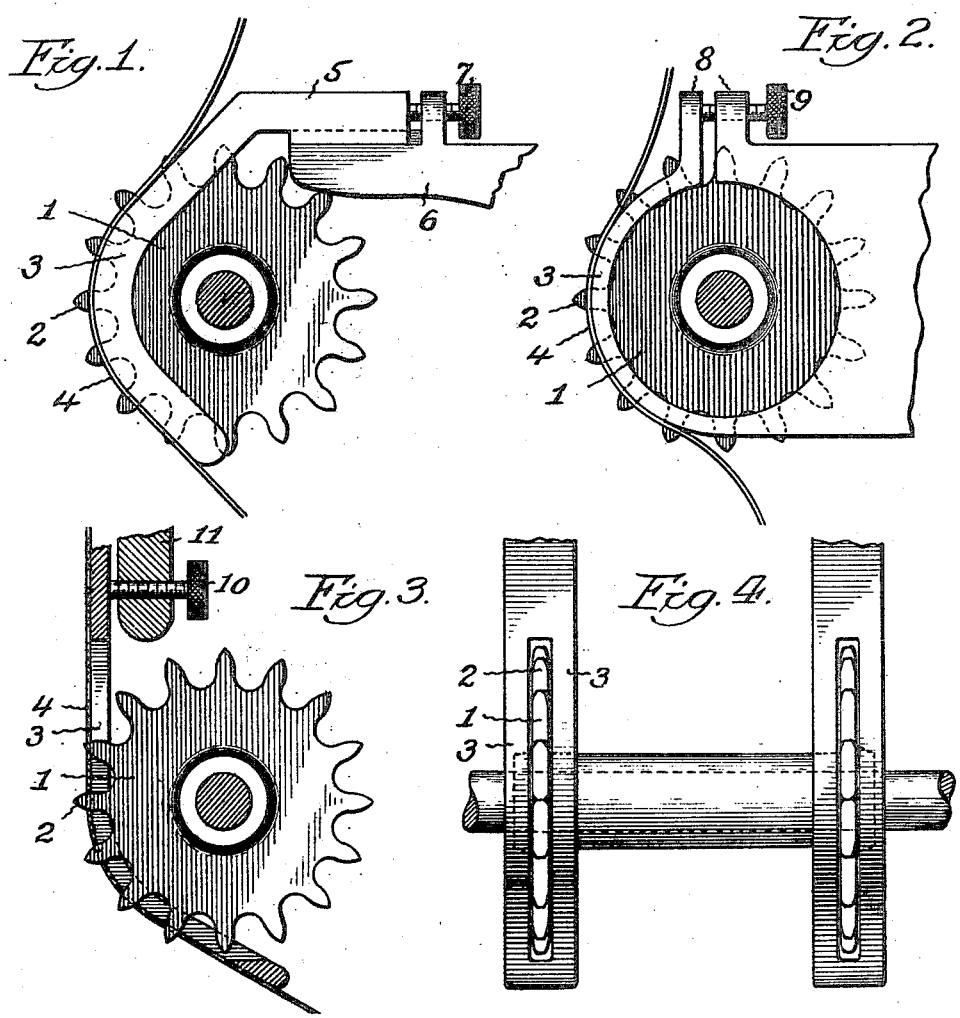

ANDREW SCHUSTEK, OF CHICAGO, ILLINOIS.

FILM-FEEDING MECHANISM.

1,139,731.  Specification of Letters Patent.  Patented May 18, 1915.

Application filed March 18, 1914. Serial No. 825,458.

*To all whom it may concern:*

Be it known that I, ANDREW SCHUSTEK, a citizen of the United States of America, and a resident of Chicago, in the county of Cook, State of Illinois, have invented certain new and useful Improvements in Film-Feeding Mechanisms, of which the following is a specification.

This invention relates to that class of film feeding mechanisms in which a marginally perforated strip is operatively engaged by a sprocket wheel in the attainment of a positive feed of said strip or film past the light orifice of a moving picture apparatus or the like. And the present improvement has for its object to provide a simple and efficient structural formation and combination of parts whereby the strip or film is effectively maintained at a predetermined distance from the axis of rotation of the feeding sprocket and in operative engagement therewith, and with which construction the above mentioned distance of the film from the axis of rotation of the sprocket can be accurately varied to compensate for changes in the spacings of the marginal perforations of the strip or film due to shrinkage of the same from age, chemical change and the like, all as will hereinafter more fully appear.

In the accompanying drawings:—Figures 1, 2, and 3, are fragmentary sectional elevations, illustrating different detail arrangements for effecting the functions of the present invention. Fig. 4, is a detail front elevation of the construction shown in Fig. 3.

Similar reference numerals indicate like parts in the several views.

Referring to the drawings, 1 represents one of the revoluble film feeding sprockets usual to the film feeding mechanisms of moving picture apparatus and the like, and which sprocket, in the present improvement, is formed of a disk of rigid material of the required thickness and having sprocket teeth 2 cut or otherwise formed in the periphery of said disk.

3, are side breasts or film supports, preferably non-revoluble, associated with the sprocket 1, and formed with outer convex surfaces, the radius of which is approximately the same as the perimeter of the sprocket 1, and adapted to maintain the passing strip or film 4, at the required and predetermined distance from the axis of rotation of said sprocket wheel to which it is adjusted as hereinafter more fully set forth. The purpose is to insure an accurate mesh between the teeth of the sprocket 1 and the series of marginal perforations in the strips or film 4. The said side breasts 3, are located at one or both sides of the sprocket wheel, preferably at both sides and formed as a single unit, slotted for the passage of the marginal portion of the sprocket disk 1, as shown more particularly in Fig. 4.

The material part of the present improvement involves mounting the film supports or breasts 3 in an adjustable manner to and from the axis of rotation of the sprocket 1 and in connection therewith means for effecting an adjustment of said film support to and from said axis. The purpose is to effect a circumferential increase or decrease in the radial or pitch distances at which the series of sprocket teeth 2 will have driving engagement with the sprocket orifices of the picture film or strip that is being used in the apparatus, and so that said peripheral or pitch distances will correspond with and be the same as the distances between the sprocket orifices of said film or strip and with the attainment of a common factor in the distances of the two elements very effective and perfect feeding of the film through the apparatus can be effected. Such adjustment, where absolute accuracy of operation is desired, will be made with each change from one reel of film to another, owing to the fact that the distances between the sprocket orifices of one film or strip may vary from that of a preceding or succeeding film, due to different shrinkage of the same from age, chemical change and the like. For instance, where the spacings of a particular film is less than that of one previously used, the film support shown in the drawings will be moved to the right, in order to bring the film nearer to the base of the sprocket teeth, thus decreasing the circumferential distance between the edges of the sprocket teeth to correspond with the distance between the perforations longitudinally of the particular film.

In the practical carrying out of the present invention it will be found convenient to have the manufacturer, after the film is ready for the market, to accurately measure the distances of the sprocket orifices, and mark the same on the film, as an index to the operator to aid in a quick adjustment of the present mechanism to a particular film.

The above described adjustment of the film support or breast 3, may be attained in any usual and suitable manner, and examples of various means of adjustment are shown in the accompanying drawings.

In Fig. 1, the film support or breast 3 is shown provided with an angular extension 5 having sliding engagement with a stationary guideway 6, and adjustable thereon, and to and from the axis of the sprocket 1, in a horizontal plane, by an adjusting screw 7. In Fig. 2, the breast or film support 3 is shown in the form of a peripherally divided resilient annulus, the ends of the divisions carrying ears 8, for the passage of an adjusting screw 9, whereby the distance of the film bearing portion of the breast is adjusted to and from the axis of rotation of the sprocket 1. In Fig. 3, the breast film support 3, is shown as a vertically depending resilient bar, which is adjusted in the manner above set forth, by an adjusting screw 10, passing through a stationary member 12 of the main frame of the apparatus.

Having thus fully described my said invention, what I claim as new and desire to secure by Letters Patent, is:—

1. In a film feeding mechanism, a revoluble sprocket having a disk like margin formed with sprocket teeth, a non-revoluble film support the bearing surface of which has adjacent relation to the peripheral teeth of the sprocket, and means for adjusting said film support to and from the axis of rotation of the sprocket to effect an increase or a decrease in the radial distances at which the teeth of the sprocket wheel will have driving engagement with the sprocket orifices of the film and attain a common factor in the distances of both elements, substantially as set forth.

2. In a film feeding mechanism, a revoluble sprocket having a disk line margin formed with sprocket teeth, a non-revoluble film support the bearing surface of which has adjacent relation to the peripheral teeth of the sprocket, and means for adjusting said film support to and from the axis of rotation of the sprocket to effect an increase or a decrease in the radial distances at which the teeth of the sprocket wheel will have driving engagement with the sprocket orifices of the film and attain a common factor in the distances of both elements, the same, comprising an angular extension on the film support, a stationary slideway supporting said extension and an adjusting screw for imparting adjustment to said extension, substantially as set forth.

Signed at Chicago, Illinois, this 12th day of March, 1914.

ANDREW SCHUSTEK.

Witnesses:
ROBERT BURNS,
IVA L. CRANE.